UNITED STATES PATENT OFFICE.

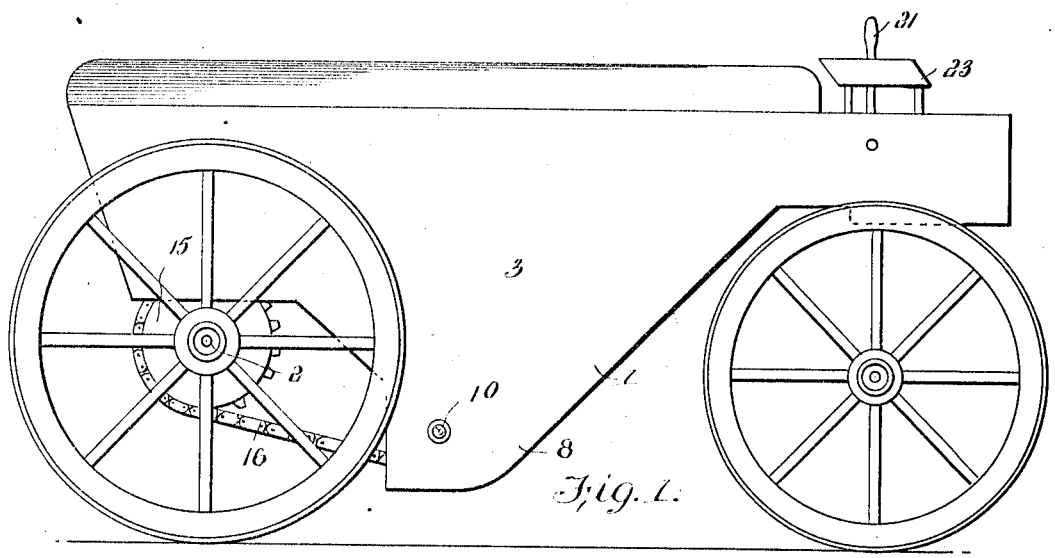
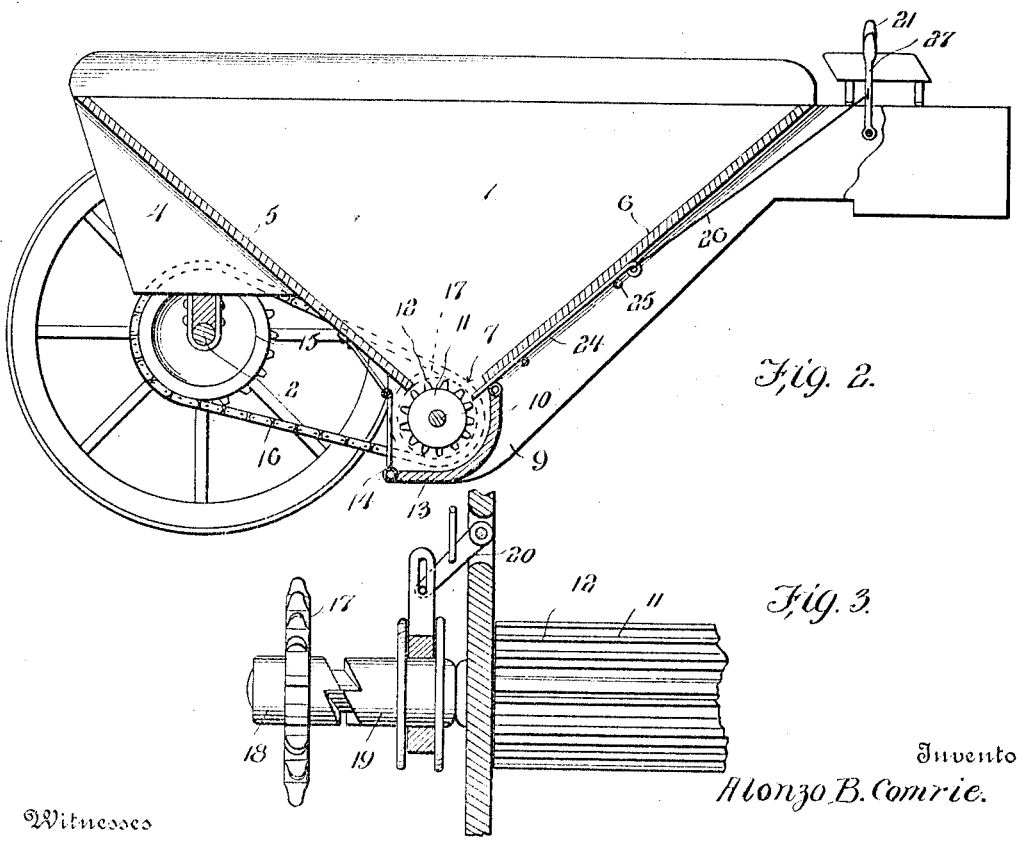

ALONZO B. COMRIE, OF PENN YAN, NEW YORK.

SPREADER.

1,040,888.  Specification of Letters Patent.  Patented Oct. 8, 1912.

Application filed January 23, 1912. Serial No. 672,813.

*To all whom it may concern:*

Be it known that I, ALONZO B. COMRIE, a citizen of the United States of America, residing at Penn Yan, in the county of Yates and State of New York, have invented new and useful Improvements in Spreaders, of which the following is a specification.

This invention relates to improvements in spreading machines or vehicles and has particular application to a machine of this character which is utilized for the purpose of spreading rock, gravel or the like upon the surfaces of roads.

In carrying out the present invention, it is my purpose to provide a vehicle of this type wherein the material may be discharged from the vehicle and distributed over the surface of the road bed in an even and uniform manner.

Furthermore, I aim to provide a vehicle of this type which will include a wheeled hopper having an outlet opening, and a feed or distributing roller below the opening in the hopper to facilitate the discharge of material from the hopper to the surface of the road, the hopper carrying an apron below the discharge opening therein and partially inclosing said roller so that the material may be discharged from the hopper at right angles thereto and in a direction rearwardly of the course of travel of the machine, thus effecting an even and uniform distribution of the material from the hopper to the surface of the road bed.

The invention has for a still further object, the provision of a vehicle of this type wherein the discharge of the material from the hopper may be controlled at the will of an operator.

With the above and other objects in view which will appear as the description progresses, the invention consists in the construction, combination and arrangement of parts hereinafter set forth in and falling within the scope of the appended claim.

In the accompanying drawing forming a part of this specification and in which has been illustrated the preferred embodiment of the invention; Figure 1 is a side elevation of a spreader constructed in accordance with the present invention. Fig. 2 is a vertical longitudinal sectional view of the same, and Fig. 3 is a detail of the invention.

Similar reference characters designate like parts throughout the several views.

Referring to the accompanying drawing in detail, the vehicle in the present instance includes a hopper body 1 mounted upon wheeled axles 2 and designed to traverse a roadway to apply a surface coating thereto. It is conceivable, however, that the vehicle may be used for other purposes where spreading of material is desired. The hopper 1 consists of the side boards 3 and 4 and the inclined end boards 5 and 6 which latter terminate at their lower ends adjacent each other to provide a discharge opening 7 for the hopper. The side boards 3 and 4 of the body as shown terminate in downwardly projecting extensions 8 and 9 upon opposite sides of the discharge opening 7 of the hopper and in these extensions is journaled a shaft 10 upon which is fixed a feed or distributing roller 11 provided with a toothed or corrugated surface 12 and extending the full width of the body immediately below the discharge opening 7 of the hopper. Hinged to the end board 6 of the hopper adjacent the discharge opening 7 thereof is an apron 13 extending the full width of the body and connected to the opposing side boards 3 and 4 of such body through the medium of spring-held rods 13'. This apron 13 is of a curved outline and substantially or partially incloses the feed roller 11, the apron 13 and extensions 8 providing a distributing opening 14 at the rear of the roller 11 and at right angles to the flow of material from the hopper.

Should the material become congested between the apron and the feed roller, incident to relatively large lumps of such material leaving the hopper, the apron 13 will give, owing to the pivotal connection of the same with the end board 6 and the spring held rods 13' between the free edge of the apron and the end board 5.

To impart movement to the roller 11 within the apron 13 and to render the roller operative and inoperative when desired, a sprocket wheel 15 is fixed to one of the rear walls of the vehicle and rotatable therewith and over this wheel is trained a chain 16 embracing a sprocket wheel 17 carried by a clutch member 18 loosely mounted upon the shaft 10, suitable means being provided to prevent lateral displacement of the clutch member 18. Splined to the shaft 10 is another clutch member 19 adapted to engage the clutch member 18 when it is desired to impart movement to the feed roller, the movement of the clutch member 19 being controlled through the medium of a link 20 pivoted intermediate its ends to one of the side boards of the body and connected at its free end with an operating lever 21 arranged adjacent the seat 23 upon the vehicle back. Thus, it will be seen that the clutch member 19 may be engaged with and disengaged from the clutch member 18 by manipulating the lever 22. This structure may be varied however and I desire to have it understood that I do not limit myself to any specific form of mechanism for transmitting motion to the roller 11 or for controlling the transmission of such motion thereto.

In order to control the feeding of the material from the hopper 1 to the apron 13 under the action of the roller 11, I have provided a gate 24 slidably mounted upon rollers 25 journaled in the side boards of the body adjacent the under surface of the end board 6. This gate as shown is designed to establish and cut off communication between the outlet opening 7 of the hopper and the apron 13 and to operate the gate for this purpose, a rod 26 is connected to one end of the gate 24 and has its opposite end connected to an operating lever 27 through the medium of a pin and slot connection, the operating lever being pivoted to one of the side boards of the frame and adjacent the seat 23 within convenient reach of an operator upon such seat. From this it will be seen that the movement of the roller 11 and the feeding of the material from the hopper 1 is at all times under the control of the operator owing to the positions of the levers 22 and 27 which control the said roller and gate respectively.

In use, the hopper 1 is filled with any suitable material, such as rock or the like, and the clutch members 18 and 19 brought into engagement to impart movement to the roller 11 in the movement of the vehicle. Simultaneous with the shifting of the clutch members, the gate 24 is operated to establish communication between the hopper and the apron 13, whereby the material from the hopper is forced into the apron 13 and rearwardly thereof and out of the discharge opening 14 formed by the extensions 8 and apron 13. From this construction it will be seen that the material is discharged in a direction at right angles to the hopper and rearwardly of the course of travel of the vehicle whereby a uniform and even distribution of the material is permitted.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described my invention, what I claim and desire to secure by Letters-Patent is:

In a vehicle of the class described, a wheeled hopper including side boards and inclined end boards and provided with an outlet opening, extensions on said side boards below the outlet opening, a feed roller journaled in said extensions below the opening in said hopper, means for operating said roller, an apron hingedly connected to said hopper below the opening therein and partially inclosing said roller, said apron and extensions forming a discharge opening at right angles to the outlet opening of the hopper, spring-held rods connecting the free edge of said apron to said hopper whereby the apron may be moved relatively to the hopper and feed roller, and a gate carried by one of said inclined end boards and slidable to establish and cut off communication between said hopper and apron.

In testimony whereof I affix my signature in presence of two witnesses.

ALONZO B. COMRIE.

Witnesses:
H. C. OVENSHIRE,
J. J. GARDNER.